(12) United States Patent
Yang et al.

(10) Patent No.: US 9,107,158 B2
(45) Date of Patent: Aug. 11, 2015

(54) ROBUST DOWNLINK TIMING SYNCHRONIZATION METHOD IN LTE SYSTEM

(75) Inventors: Xiumei Yang, Shanghai (CN); Yong Xiong, Shanghai (CN); Guoqing Jia, Shanghai (CN); Lei Zhu, Shanghai (CN); Shupei Lei, Shanghai (CN); Zhengkun Yi, Shanghai (CN)

(73) Assignee: SHANGHAI RESEARCH CENTRE FOR WIRELESS COMMUNICATION, Changning Distict, Shanghai (CN)

( * ) Notice: Subject to any disclaimer, the term of this patent is extended or adjusted under 35 U.S.C. 154(b) by 130 days.

(21) Appl. No.: 14/006,960

(22) PCT Filed: Jan. 11, 2012

(86) PCT No.: PCT/CN2012/070214
§ 371 (c)(1),
(2), (4) Date: Sep. 23, 2013

(87) PCT Pub. No.: WO2012/126283
PCT Pub. Date: Sep. 27, 2012

(65) Prior Publication Data
US 2014/0036779 A1    Feb. 6, 2014

(30) Foreign Application Priority Data

Mar. 23, 2011   (CN) .......................... 2011 1 0071169

(51) Int. Cl.
*H04W 56/00*    (2009.01)
*H04J 11/00*    (2006.01)

(52) U.S. Cl.
CPC ......... *H04W 56/003* (2013.01); *H04J 11/0073* (2013.01)

(58) Field of Classification Search
None
See application file for complete search history.

(56) References Cited

U.S. PATENT DOCUMENTS

2011/0007704 A1*  1/2011  Swarts et al. ................. 370/330

FOREIGN PATENT DOCUMENTS

CN        101834657 A  *  9/2010
CN        101388723 B  *  7/2012

OTHER PUBLICATIONS

Xiumei Yang et al. (PSS Based Time Synchronization for 3GPP LTE Downlink Receivers, Sep. 28, 2011, pp. 930-933, ISBN: 978-1-61284-306-3).*

*Primary Examiner* — Ian N Moore
*Assistant Examiner* — Brian T Le
(74) *Attorney, Agent, or Firm* — Tianhua Gu; Global IP Services

(57) ABSTRACT

A robust downlink timing synchronization method for reducing the influence of initial frequency offset and ensuring the timing synchronization in a low signal-to-noise ratio interval in an LTE system, which includes: step 1: a receiving terminal continuously storing time domain signal sequences of M PSS transmission periods; step 2: performing narrowband filtering on the time domain signal sequences of the M PSS transmission periods; step 3: performing down-sampling on data obtained after the filtering; step 4: performing sliding differential mirror correlation on the down-sampling data of an $m^{th}$ PSS transmission period to obtain a correlation value of an $i^{th}$ instant; step 5: superposing correlation results to obtain a superposition result; and step 6: determining whether the superposition result has an obvious peak interval; if yes, completing capturing the primary synchronization signal, and obtaining timing information according to a position of a maximum correlation peak; otherwise, returning to step 1.

5 Claims, 2 Drawing Sheets

ROBUST DOWNLINK TIMING SYNCHRONIZATION METHOD IN LTE SYSTEM

CROSS REFERENCE TO RELATED PATENT APPLICATION

The present application is the US national stage of PCT/CN2012/070214 filed on Jan. 11, 2012, which claims the priority of the Chinese patent application No. 201110071169.2 filed on Mar. 23, 2011, which application is incorporated herein by reference.

BACKGROUND OF THE PRESENT INVENTION

1. Field of Invention

The present invention relates to the field of mobile communications technology, and more particularly to a robust downlink timing synchronization method in an LTE system.

2. Description of Related Arts

In an LTE system, a base station of a cell sends a primary synchronization signal (PSS) carrying a cell identifier every 5 ms, and one of the main functions of the primary synchronization signal is downlink synchronization.

The PSS of the LTE system is generated by ZC sequences. There are three groups of different sequences in use. During the cell search process, the group of PSS sent by the base station is blind for the user. Therefore, when PSS is used for timing synchronization, the user generally stores three groups of local PSS sequences in advance, and each group of PSS has sliding correlation with a received signal respectively, and when an obvious correlation peak is detected, it is determined that the timing information is obtained. Such processing has a problem that the correlation operation of three groups is complicated which is disadvantageous for rapid acquisition of the timing information. In addition, if the user is located in a synchronous network, and performs correlation by using local synchronization sequences and received sequences, synchronization signals sent by other cells will have interference with the received signal of the current cell. Therefore, the method has different detection performance for different frequency offsets. In particular, when the frequency offset is large, the detection performance is poor. In addition, although this method has good timing performance within high signal-to-noise ratio intervals due to fine correlation properties of the PSS sequences. However, when the signal reception energy is low, that is, when the signal-to-noise ratio is low, the method has poor performance.

In the initial synchronization stage, the receiver has not obtained the signal offset in the received signal and the channel state of the user. Therefore, to ensure good timing synchronization performance, a timing method must have the following features: (1) being insensitive to the frequency offset, and (2) being capable of working normally when the signal-to-noise ratio is low. In other words, in practical applications, the timing method must have good robustness to the frequency offset and signal-to-noise ratio.

SUMMARY OF THE PRESENT INVENTION

The present invention aims to solve the following technical problem: providing a robust downlink timing synchronization method in an LTE system, which has good robustness under the conditions of large frequency offset and low signal-to-noise ratios.

To solve the technical problem above, the present invention adopts the following technical solution.

A robust downlink timing synchronization method in an LTE system includes the following steps:

Step 1: a receiving terminal continuously storing time domain signal sequences of M PSS transmission periods;

Step 2: performing narrowband filtering on the time domain signal sequences of the M PSS transmission periods;

Step 3: performing down-sampling on data obtained after the filtering;

Step 4: performing sliding differential mirror correlation on the down-sampling data of the $m^{th}$ PSS transmission period to obtain a correlation value $R_i(m)$ at the $i^{th}$ instant, where m=0, 1, 2, ... M−1;

Step 5: superposing correlation results to obtain $$R(i) = \frac{1}{M}\sum_{m=0}^{M-1} R_i(m);$$

and

Step 6: determining whether the superposition result R(i) has an obvious peak interval; if yes, completing capturing the primary synchronization signal, and obtaining timing information according to the position of the maximum correlation peak; otherwise, returning to step 1.

As a preferential solution of the present invention, a detailed implementation process of step 1 is: the receiving terminal continuously storing the time domain signal sequences of the M PSS transmission periods, and recording the sequences as:

$y=[y_0(0), y_0(1), \ldots, y_0(N-1), y_1(0), y_1(1), \ldots, y_1(N-1), \ldots, y_{M-1}(0), y_{M-1}(1), \ldots, y_{M-1}(N-1)]$ where one PSS transmission period is 5 ms, N is the received data length in every 5 ms, M is the number of the 5 ms periods to be superposed, and M≥1.

As another preferential solution of the present invention, a data sampling rate of the time domain signal sequences is 30.72 MHz, a data sampling rate after the down-sampling is 0.96 MHz, and the data obtained after the down-sampling is recoded as:

$\bar{y}=[\bar{y}_0(0), \bar{y}_0(1), \ldots, \bar{y}_0(\bar{N}-1), \bar{y}_1(0), \bar{y}_1(1), \ldots, \bar{y}_1(\bar{N}-1), \ldots, \bar{y}_{M-1}(0), \bar{y}_{M-1}(1), \ldots, \bar{y}_{M-1}(\bar{N}-1)]$ where $\bar{y}_m(\cdot)$ is received data in the $m^{th}$ 5 ms period after the down-sampling, and $\bar{N}$ is the data length in every 5 ms after the down-sampling.

As another preferential solution of the present invention, in step 4, the performing time domain sliding differential mirror correlation on the down-sampling data of an $m^{th}$ 5 ms period to obtain a correlation value at the $i^{th}$ instant is:

$$R_i(m) = \frac{1}{30}\sum_{k=1}^{30} r_{m,i}(k) = \frac{1}{30}\sum_{k=1}^{30} \bar{y}_m^*(k+1+C)\bar{y}_m(k+C)\bar{y}_m^*(-k+C)\bar{y}_m(-k+1+C)$$

where the superscript* represents complex conjugate, C=i+64/2 is the symmetry center, and k is a summation index.

As another preferential solution of the present invention, in step 6, it is determined whether the obvious peak interval exists according to an absolute value or a square of an absolute value of R(i).

The beneficial effects of the present invention lie in that: the robust downlink timing synchronization method in an LTE system according to the present invention performs time domain differential mirror operation on time domain received signals, and implements synchronization by superposing correlation results in multiple primary synchronization signal periods, which effectively reduce the influence of initial frequency offset and ensure the timing synchronization in a low signal-to-noise ratio interval. Therefore, the method of the present invention has fine utility under the receiving conditions where the initial frequency offset is not compensated and the channel transmission environment is unknown, and has good robustness.

DETAILED DESCRIPTION OF THE PREFERRED EMBODIMENTS

To solve the problems discussed above, the present invention provides a robust downlink timing synchronization method in an LTE system, which mainly includes: superposing correlation operation results in multiple PSS periods, and performing mirror differential operation for the correlation operation in each PSS period. The time domain differential operation can reduce the influence caused by frequency offset, and the mirror operation can generate a correlation peak in a PSS symbol. By superposing the correlation results in multiple PSS periods, the peak result can be improved significantly. Therefore, the method is insensitive to the initial frequency offset, and an obvious correlation peak can be observed under the condition of a low signal-to-noise ratio according to the method.

Detailed implementation manners of the present invention are described in the following with reference to the accompanying drawings.

Embodiment 1

Figure 1:
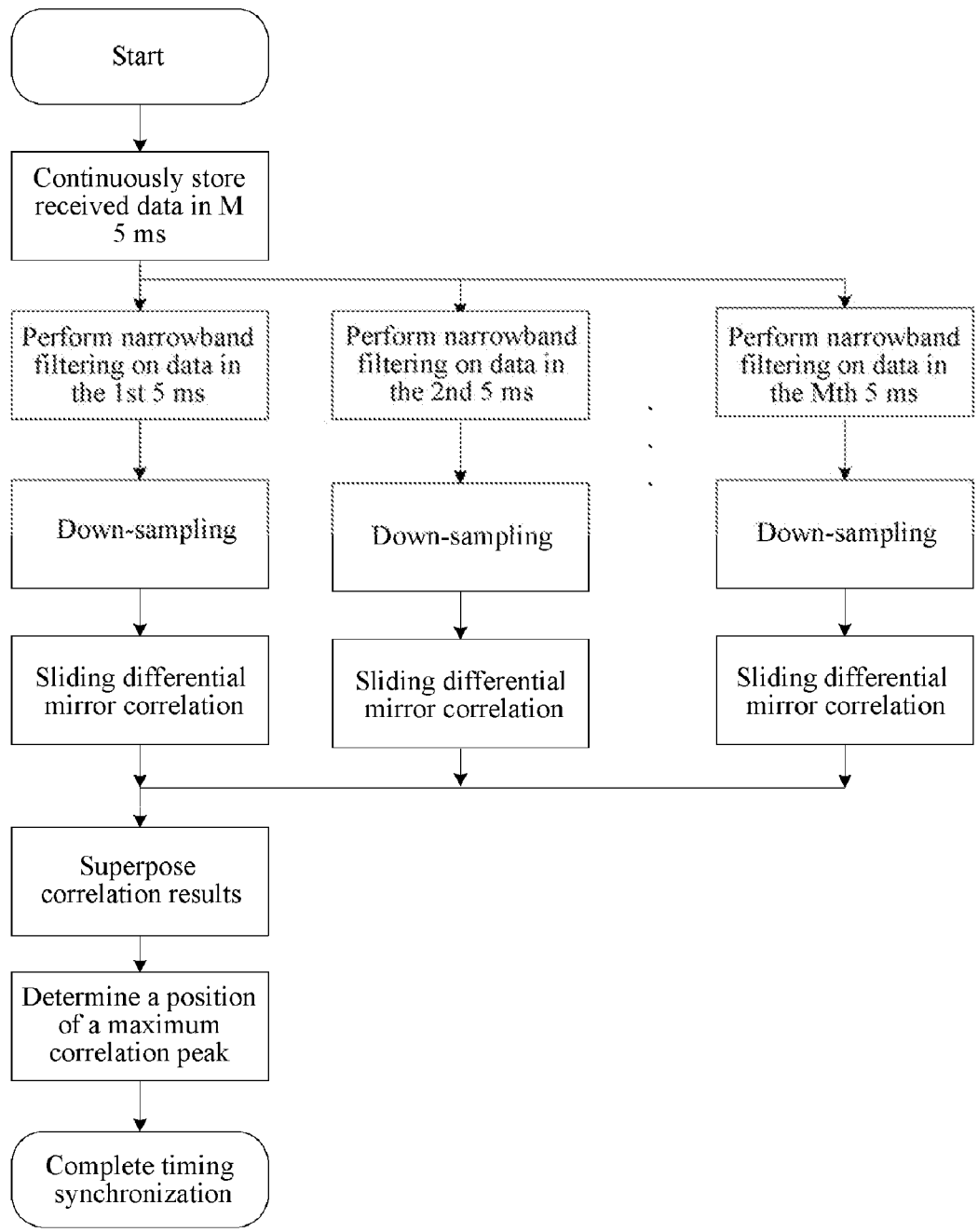
FIG. 1 is a flow chart of a robust downlink timing synchronization method in an LTE system according to the present invention.

This embodiment provides a robust downlink timing synchronization method in an LTE system. The method has good robustness to the initial frequency offset and low signal-to-noise ratio. A specific process of the method is shown in FIG. 1, which includes the following steps:

(1) Signal storage.

A receiving terminal continuously stores time domain signal sequences of M PSS periods (a period is 5 ms), and the received signal is recorded as:
y=[y$_0$(0), y$_0$(1), . . . , y$_0$(N−1), y$_1$(0), y$_1$(1), . . . , y$_1$(N−1), . . . , y$_{M-1}$(0), y$_{M-1}$(1), . . . , y$_{M-1}$(N−1)], where N is a received data length in every 5 ms, M is the number of the 5 ms periods to be superposed, and M≥1.

(2) Obtaining received data on a synchronization signal bandwidth through filtering.

Narrowband filtering is performed on the received signal in M 5 ms. A bandwidth occupied by the data signal is the transmission bandwidth of the LTE system, which is 18 MHz at maximum, where the primary synchronization signal occupies 62 sub-carriers, the bandwidth is 930 kHz, and 5 null sub-carriers exist on each terminal of the signal. Therefore, the total occupied bandwidth is 1.08 MHz. The filtering processing is performed on the received data on the synchronization signal bandwidth (0.93-1.08 MHz) to eliminate the interference of the data sub-carriers. The narrowband filter may be obtained according to a filter group or a general band-pass filter, and is not particularly defined herein.

(3) Down-sampling.

The received data has a high sampling rate (30.72 MHz in general). Down-sampling is performed on the data obtained after the filtering, and the data sampling rate after the down-sampling is 0.96 MHz (equivalent to 32-fold down-sampling). Under this sampling rate, IFFT/FFT with N$_{fft}$=64 may be adopted. The data after the down-sampling is recorded as:

$$\bar{y}=[\bar{y}_0(0), \bar{y}_0(1), \ldots, \bar{y}_0(\bar{N}-1), \bar{y}_1(0), \bar{y}_1(1), \ldots, \bar{y}_1(\bar{N}-1), \ldots, \bar{y}_{M-1}(0), \bar{y}_{M-1}(1), \ldots, \bar{y}_{M-1}(\bar{N}-1)]$$

where $\bar{y}_m(\cdot)$ is received data in the m$^{th}$ 5 ms period after the down-sampling, and $\bar{N}$ is a data length in every 5 ms after the down-sampling.

(4) Time domain sliding differential mirror correlation.

The sliding differential mirror correlation is performed on the down-sampling data of the m$^{th}$ 5 ms period to obtain a correlation value at an i$^{th}$ instant:

$$R_i(m) = \frac{1}{30}\sum_{k=1}^{30} r_{m,i}(k) = \frac{1}{30}\sum_{k=1}^{30} \bar{y}_m^*(k+1+C)\bar{y}_m(k+C)\bar{y}_m^*(-k+C)\bar{y}_m(-k-1+C)$$

where a superscript* represents complex conjugate, and C=i+64/2 is a symmetry center.

(5) Superposition of correlation results.

The correlation results are superposed according to the following formula:

$$R(i) = \frac{1}{M}\sum_{m=1}^{M} R_i(m),$$

where M is a positive integer determined according to performance and complexity requirements. For example, M is a relatively small value when the signal-to-noise ratio is high, or a relatively large integer when the signal-to-noise ratio is low.

(6) Determination of a correlation peak.

It is determined whether an obvious peak interval exists according to an absolute value or a square of an absolute value of R(i). If yes, complete capturing the primary synchronization signal, and obtain timing information according to a position of a maximum correlation peak; otherwise, continue the detection, or repeat the above steps on other frequency bands.

Embodiment 2

Figure 2:
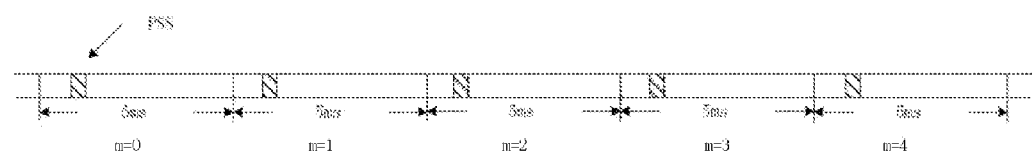
FIG. 2 is a schematic diagram of data receiving in 5 ms according to Embodiment 2.

This embodiment describes the robust downlink synchronization method in an LTE system according to the present invention in detail by taking single antenna receiving of a mobile user for example. The data reception in continuous 5 ms is as shown in FIG. 2, in which M=5. The transmission bandwidth of the system is 20 MHz, and the received data sampling rate is 30.72 MHz. Then, the data length in 5 ms is N=15360, and the received data may be expressed by:

$$y=[y_0(0), y_0(1), \ldots, y_0(15359), y_1(0), y_1(1), \ldots, y_1(15359), \ldots, y_4(0), y_4(1), \ldots, y_4(15359)].$$

The LTE is a multi-bandwidth system. Assume that the filter group obtains signals on the synchronization signal bandwidth, and performs data filtering on the received data in the first 5 ms to obtain a signal with the sampling rate of 1.92

MHz on the bandwidth of 1.08 MHz. After 2-fold down-sampling, a 0.96 MHz received signal is obtained, the number of symbols in every 5 ms period $\bar{N}$=480, and the received data in M periods is expressed by:

$$\bar{y}=[\bar{y}_0(0), \bar{y}_0(1), \ldots, \bar{y}_0(479), \bar{y}_1(0), \bar{y}_1(1), \ldots,$$
$$\bar{y}_1(479), \ldots, \bar{y}_4(0), \bar{y}_4(1), \ldots, \bar{y}_4(479)].$$

The following operation is performed for m=0, 1, 2, 3, 4 respectively.

$$R_i(m) = \frac{1}{30}\sum_{k=1}^{30} r_{m,i}(k) = \frac{1}{30}\sum_{k=1}^{30} \bar{y}_m^*(k+1+C)\bar{y}_m(k+C)\bar{y}_m^*(-k+C)\bar{y}_m(-k-1+C)$$

where i=0, 1, ..., 416, and the maximum value of i is 416, because the maximum value of $\bar{y}_m$ is 479, and this value can be solved according to $(k+1+i+32)_{max,k=30}$=479; C=i+32. The results in every 5 ms period have a sum and average operation, that is:

$$R(i) = \frac{1}{5}\sum_{m=0}^{4} R_i(m).$$

The value interval of i (0≤i≤384) is traversed, the maximum peak determined according to $|R(i)|$ or $|R(i)|^2$ is the position of PSS, and the timing information of 5 ms is obtained at the same time.

The key issue in the robust downlink timing synchronization method in an LTE system according to the present invention is: the correlation peak is obtained by superposing mirror differential correlation results in multiple PSS periods. During the timing synchronization process, in the circumstances where the initial frequency offset and the signal-to-noise ratio are uncertain (especially when the signal receiving quality is poor and the signal-to-noise ratio is low), the present invention provides a timing synchronization method with good robustness, which can be used for initial synchronization of downlink receiving users in a 3GPP LTE system.

The description and utilization of the present invention are illustrative, and are not intterminaled to limit the scope of the present invention within the above embodiments. Modifications and variations to the embodiments disclosed herein are possible. To persons of ordinary skill in the art, the replacement and equivalent components are well known. Persons skilled in the art shall be aware that the present invention may be implemented in other forms, structures, layout, and proportions and by using other elements, materials, and components without departing from the spirit or essential features of the present invention.

What is claimed is:

1. A robust downlink timing synchronization method in a LTE system, comprising the following steps:
   step 1: a receiving terminal continuously storing time domain signal sequences of M PSS transmission periods, wherein M is a number of the 5 ms periods to be superposed, and M≥1, PSS means primary synchronization signal;
   step 2: performing narrowband filtering on the time domain signal sequences of the M PSS transmission periods;
   step 3: performing down-sampling on data obtained after the filtering;
   step 4: performing sliding differential mirror correlation on the down-sampling data of an $m^{th}$ PSS transmission period to obtain a correlation value Ri(m) of an $i^{th}$ instant that is a time point selected within the $m^{th}$ PSS transmission period, wherein m=0, 1, 2, ... M−1;
   step 5: superposing a group of correlation values Ri(m) of each PSS transmission period obtained from the step 4 to obtain $$R(i) = \frac{1}{M}\sum_{m=0}^{M-1} R_i(m);$$

and
   step 6: determining by the receiving terminal whether the superposition result R(i) obtained from the step 5 has an obvious peak interval; if yes, completing capturing the PSS, and obtaining timing information according to a position of a maximum correlation peak for reducing influence of initial frequency offset and ensuring timing synchronization in a low signal-to-noise ratio interval; otherwise, returning to step 1.

2. The robust downlink timing synchronization method in the LTE system according to claim 1, wherein a specific implementation process of step 1 is: the receiving terminal continuously storing the time domain signal sequences of the M PSS transmission periods, and recording as:

$$y=[y_0(0), y_0(1), \ldots, y_0(N-1), y_1(0), y_1(1), \ldots,$$
$$y_1(N-1), \ldots, y_{M-1}(0), y_{M-1}(1), \ldots, y_{M-1}(N-1)]$$

wherein one PSS transmission period is 5 ms, N is a received data length in every 5 ms.

3. The robust downlink timing synchronization method in the LTE system according to claim 2, wherein a data sampling rate of the time domain signal sequences is 30.72 MHz, a data sampling rate after the down-sampling is 0.96 MHz, and the data obtained after the down-sampling is recoded as:

$$\bar{y}=[\bar{y}_0(0), \bar{y}_0(1), \ldots, \bar{y}_0(\bar{N}-1), \bar{y}_1(0), \bar{y}_1(1), \ldots,$$
$$\bar{y}_1(\bar{N}-1), \ldots, \bar{y}_{M-1}(0), \bar{y}_{M-1}(1), \ldots, \bar{y}_{M-1}(\bar{N}-1)]$$

wherein $\bar{y}_m(\cdot)$ is received data in the $m^{th}$ 5 ms period after the down-sampling, and $\bar{N}$ is a data length in every 5 ms after the down-sampling.

4. The robust downlink timing synchronization method in the LTE system according to claim 3, wherein in step 4, the performing time domain sliding differential mirror correlation on the down-sampling data of an $m^{th}$ 5 ms period to obtain a correlation value of an $i^{th}$ instant is:

$$R_i(m) = \frac{1}{30}\sum_{k=1}^{30} r_{m,i}(k) = \frac{1}{30}\sum_{k=1}^{30} \bar{y}_m^*(k+1+C)\bar{y}_m(k+C)\bar{y}_m^*(-k+C)\bar{y}_m(-k-1+C)$$

where a superscript * represents complex conjugate, C=i+64/2 is a symmetry center, and k is a summation index.

5. The robust downlink timing synchronization method in the LTE system according to claim 1, wherein in step 6, it is determined whether the obvious peak interval exists according to an absolute value or a square of an absolute value of R(i).

* * * * *